United States Patent [19]

Brayman

[11] Patent Number: 4,523,452
[45] Date of Patent: Jun. 18, 1985

[54] METHOD OF MEASURING LEAK RATES

[76] Inventor: Semyon Brayman, 28023 Berkshire, Southfield, Mich. 48076

[21] Appl. No.: 602,711

[22] Filed: Apr. 23, 1984

[51] Int. Cl.³ .............................................. G01M 3/26
[52] U.S. Cl. ......................................... 73/40; 73/49.2; 340/605
[58] Field of Search ...................... 73/40, 49.2, 40.5 R; 340/605, 606

[56] References Cited

U.S. PATENT DOCUMENTS

| | | | |
|---|---|---|---|
| 3,123,900 | 3/1963 | Millar | 29/157 R |
| 3,331,237 | 7/1967 | Strang | 73/40 |
| 3,691,821 | 9/1972 | Davey | 73/49.2 |
| 3,872,712 | 3/1975 | Westervelt et al. | 73/40 |
| 3,893,332 | 7/1975 | Dolan et al. | 73/40 |
| 4,350,038 | 9/1982 | Soncrant | 73/49.2 |
| 4,364,261 | 12/1982 | Askwith et al. | 73/49.2 |

FOREIGN PATENT DOCUMENTS 58-21119  2/1983  Japan ....................................... 73/40

Primary Examiner—Peter Hruskoci
Attorney, Agent, or Firm—John R. Benefiel

[57] ABSTRACT

An improved method of measuring leak rates by placing a source of fluid pressure in communication with a cavity being tested, and measuring the flow rate to the cavity after a predetermined time to determine the leak rate from the cavity. The improved method achieves a determination of the leak rate in a shorter time than that required to establish steady state flow conditions between the pressure source and the test piece cavity. The improved method measures the flow rate to the test piece cavity at a much earlier time after pressurization of the cavity than normally required to establish such steady state conditions, and applies a previously generated calibration function based on a linear correspondence between the measured flow rates and the steady state flow rates. Flow rate measurements at the earlier time in the test cycle in regular testing of testing pieces are converted to steady state flow rates by application of the calibration function to substantially shorten the time required for leak rate testing of the test pieces.

5 Claims, 5 Drawing Figures

४,५२३,४५२

METHOD OF MEASURING LEAK RATES

BACKGROUND DISCUSSION

The present invention concerns leak testing of cavities in test pieces, and more particularly a method of measuring such leak rates by placing the cavities of the test pieces in communication with a fluid pressure source, and measuring the flow rate to the test cavity from the pressure source after a predetermined time period sufficient to establish steady state flow conditions, such flow rates corresponding to the leak rate from the cavity of the test piece.

DESCRIPTION OF THE PRIOR ART

Such leak detectors utilizing measurement of flow to a cavity of the test piece are described in U.S. Pat. Nos. 3,872,712 to Westervelt et al and 3,691,821 to Davey.

This is contrasted with an alternate method called "pressure decay" leak rate testing in which a cavity is pressurized and then isolated from a source of pressure, and the rate of decay from the pressure within the cavity providing an indication of the leakage rate from the cavity of the test piece. An example of a pressure decay system is shown in U.S. Pat. No. 3,331,237 to Strang.

It has been heretofore appreciated that a pressure decay system suffers from the disadvantage of requiring a lengthy interval of time for completion of the test. The air flow type systems, on the other hand, have the advantage of a shorter test time requirement.

In flow type leak testing, there is often provided a prefill circuit associated with the pressure source, which affords a rapid buildup of pressure in the test cavity. The prefill circuit consist of a high volume capacity passage placed in communication during a brief "prefill" interval, and thereafter the communication with the pressure source is exclusively through a relatively small capacity passageway within which the flow rate to the cavity of the test piece is measured. The sequence of prefilling and thereafter discontinuing communication of the prefill circuit with the pressure source causes complicated and erratic transient flow conditions to exist in the flow rate measuring passageway, as the cavity is fully pressurized.

Notwithstanding this improvement, there is still required a significant interval of time in order to achieve steady state conditions within the flow rate measuring passageway. The prior art approach has been to measure the flow rate after the transient flow conditions have stabilized, and a steady state laminar flow condition exists in the flow rate passageway.

Typically, a laminar flow element is utilized placed in the aforementioned flow rate measuring passageway to measure the flow rate, by measuring the differential pressure across the element. See U.S. Pat. No. 3,123,900 to Millar for an example of such laminar flow device.

The prefill circuitry reduces the time required to pressurize the cavity of the test piece, which can be considerable particularly in cavities having substantial enclosed volume. However, the need to wait for the establishment of steady state flow conditions also requires a relatively extended time interval to conduct the leak test.

Accordingly, it is an object of the present invention to provide a method of measuring leak rates by means of flow rate leak testing method, but in which the interval required for determination of the steady state flow rate is minimized over the methods heretofore practiced and to provide such method which produces reliable, accurate results, and is readily adaptable to test pieces of varying configurations and test parameters.

SUMMARY OF THE INVENTION

This and other objects of the present invention, which will become apparent upon a reading of the following specification and claims, are achieved by measuring the flow rate to the cavity of the test piece prior to the establishment of steady state flow conditions and converting such flow rate measurement to a corresponding steady state flow rate. This conversion is achieved by generating a calibration function from calibration tests conducted on sample test pieces.

A zero leak test part is pressurized by the pneumatic circuitry and the flow rate to the cavity of the zero leak test part is measured at a time t in the test cycle. The time t is previously determined, as by experiments, to be the earliest point in the cycle time at which repeatable flow rates for a given test piece configuration are able to be achieved.

A second sample test piece having a known leak rate is leak tested during the calibration test to determine the flow rate at the same time t.

A linear calibration function of the form $y = A + Bx$ is then derived from the data of the calibration tests in which y is the steady state flow rate, x is the flow rate at the time t in the test cycle, and A and B are constants calculated from the data of the calibration tests. During subsequent leak testing, the flow rate to the test piece is measured at the time t, and converted as by a microprocessor to the corresponding steady state flow rate, using the calibration function.

The calculated steady state flow rate is compared with predetermined values of "accept" and "reject" leakage rate values and an accept/reject indication displayed, as well as the calculated steady state flow rate corresponding to the leak rate test piece.

The flow test apparatus may include parallel passages, each in communication with a pneumatic pressure source, with one of the parallel passages constituting a rapid prefill means and the other of the parallel passages of low volume capacity and through which the flow measurements are made. A test piece having a predetermined leak can be simulated by providing a controlled leakage from a pneumatic circuit, via a flow meter to allow the calibration test to be conducted with a single zero leak sample test piece.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
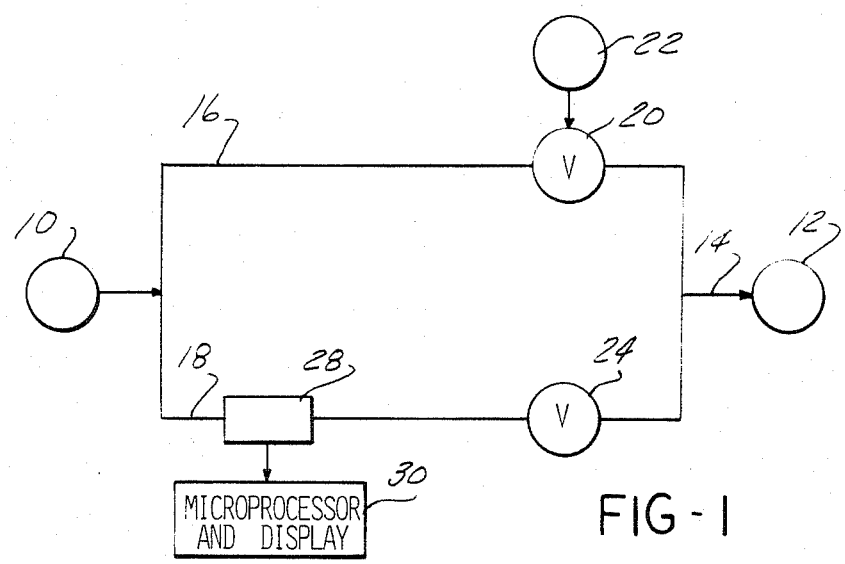
FIG. 1 is a diagrammatic representation of a leak testing pneumatic circuit utilized for flow rate leak testing of test pieces.

Referring to FIG. 1, the essential components of the leak testing apparatus employed in the flow type leak testing are depicted in block diagram form. This consists of a source of fluid pressure 10 which is placed in communication with a cavity of the test piece 12 as by being placed over a port passage 14. Port passage 14 in turn is in communication with the pressure source 10 by a pair of parallel passages 16 and 18, passage 16 constituting a prefill circuit which provides a relatively large volume capacity passage to the test port 14. The communication between the fluid pressure source 10 and the test port 14 via prefill passage 16 is controlled by means of a valve 20 which in turn is activated by means of timer 22, which upon initiation of the test cycle, opens the valve 20 and allows a rapid pressurization of the cavity in the test piece 12. After a predetermined interval, referred to as the bypass time, the timer 22 closes the valve 20 to interrupt communication between the pressure source 10 and the test piece 12 via prefill passage 16.

The test port passage 14 is also placed in communication with the pressure source 10 by a relatively low volume passageway 18 which may also be in communication therethrough and be controlled by a valve 24. The low volume passage 18 constitutes the passage through which the flow is measured after the prefill portion of the cycle.

This may be achieved by a flow measuring element 28 which generates electrical signals corresponding to the flow rate in the passage 18, transmitted to a microprocessor and display 30, which generates the corresponding flow rates from the signals transmitted by the flow rate transducer 28.

Many such suitable transducers are well known to those skilled in the art such as the aforementioned differential pressure measurement element described in U.S. Pat. No. 3,123,900 which generates a differential pressure which in turn corresponds to the flow rate within the passage 18.

Upon measurement of the flow rate in the passage 18 under steady state conditions, the leakage rate from the test piece cavity is determined, in the manner well known to those skilled in the art.

Figure 2:
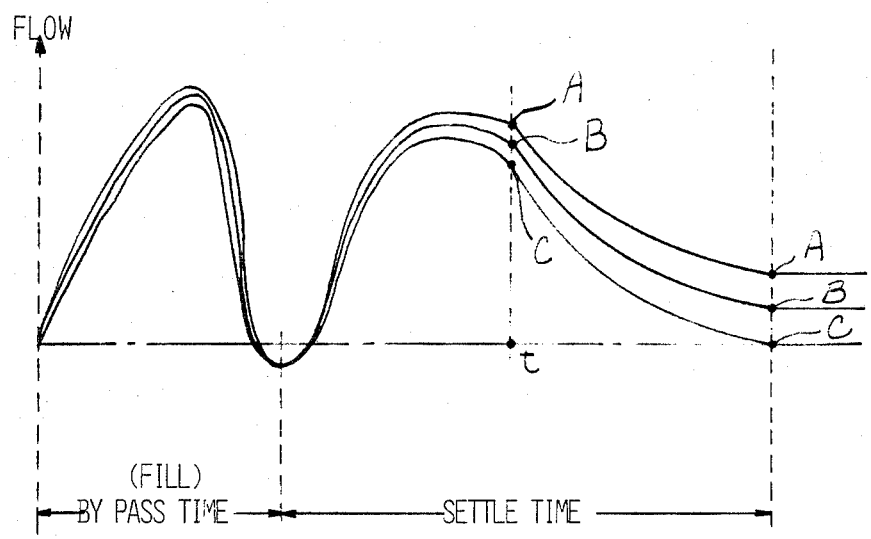
FIG. 2 is a plot of measured flow rates over time from the initiation of the test cycle.

Referring to FIG. 2, changes in flow rate in passage 18 with the progression of the test cycle may be understood. The flow in passage 18 typically surges during the prefill or bypass time indicated in FIG. 2, thereafter declining and again increasing after closing of the valve 20, to a peak level to thereafter decline and eventually reach a steady state flow condition after the settle time interval, all as indicated in FIG. 2.

The steady state condition corresponds to the leakage rate from the cavity of the test piece 12.

Three plots are shown in FIG. 2, one of a test piece "A" having a predetermined leak rate, a second "B" having a lower leak rate, and a zero leak test piece "C". After the settle time and the achievement of the steady state conditions, the nonleaking test part shows a zero flow rate in the passage 18; while the test pieces A and B show corresponding positive flow rates in turn corresponding to the leak rates from the cavity of the test piece 12.

It has been established that at an earlier time in the test cycle, repeatable flow rates will be found for a given leak rate from similar test piece configurations, albeit such flow rates are much different from the leak rates under steady state conditions, i.e., the flow rates in passage 18 after establishment of steady state flow conditions.

It has further been determined by the present inventor that a correspondence between the flow rate values measured at the time t and the steady state flow rate values exist such that upon measurement of two of the flow rates at the time t of test pieces having differing leak rates, a calibration function may be generated such that flow rates at the earlier time t may be utilized to generate steady state flow values, to thereby greatly shorten the time required for completion of the leak test.

It has further been determined that this calibration function is comprised of a linear function, of the form $f(y) = A + Bx$.

Figure 3:
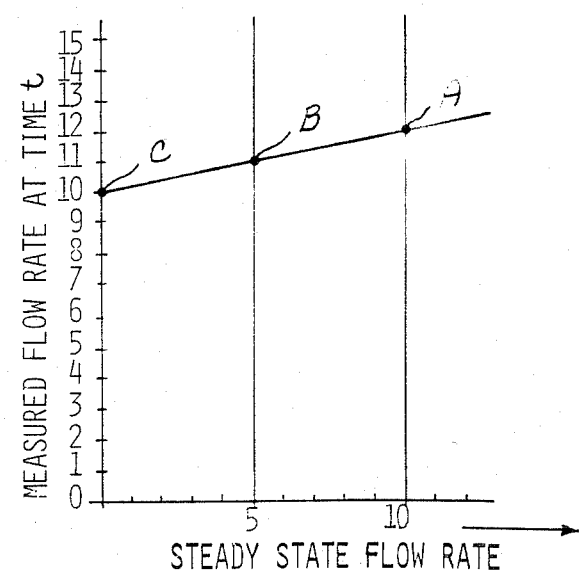
FIG. 3 is a plot of the measured flow rate at a time t in the test cycle with respect to the steady state flow rate.

This can be understood by reference to FIG. 3 which depicts a plot of measured flow rate at the time t versus steady state flow rates. Assume that at the time t, the measured flow rate is equal to 10 flow units for the zero leak test piece. Assume that the measured flow rate at the time t and the leak test specimen A equals 12 flow units and for the B test specimen, a flow rate of 11 flow units exists.

The steady state flow rate for the zero leak test piece C equals 0, that for the B test piece equals 5, and for the A test piece equals 10 flow units.

According to the concept of the present invention, a straight line may be drawn between these points as shown in FIG. 3 and all values of measured flow rates at the time t may be converted to a steady state flow rate by application of the y axis intercept function according to the present invention. For example, if test piece B has a measured flow rate of 11 flow units at time t, the steady state flow rate will lie midway between the steady state flow rates of test specimens A and C, i.e., 5 units as indicated in the plot of FIG. 3.

Thus, the calibration function $y = A + Bx$ is determined where y is the steady state flow rate, A and B are constants calculated from the calibration tests and x is the flow rate measured at the time t during the test cycle.

In the above-given example, A and B may be computed to equal −50 and 5, respectively, such that the calibration function for the example given is $y = (-50) + 5x$, and for each x a steady state flow value y may then be calculated while requiring only two calibration tests.

Figure 4:
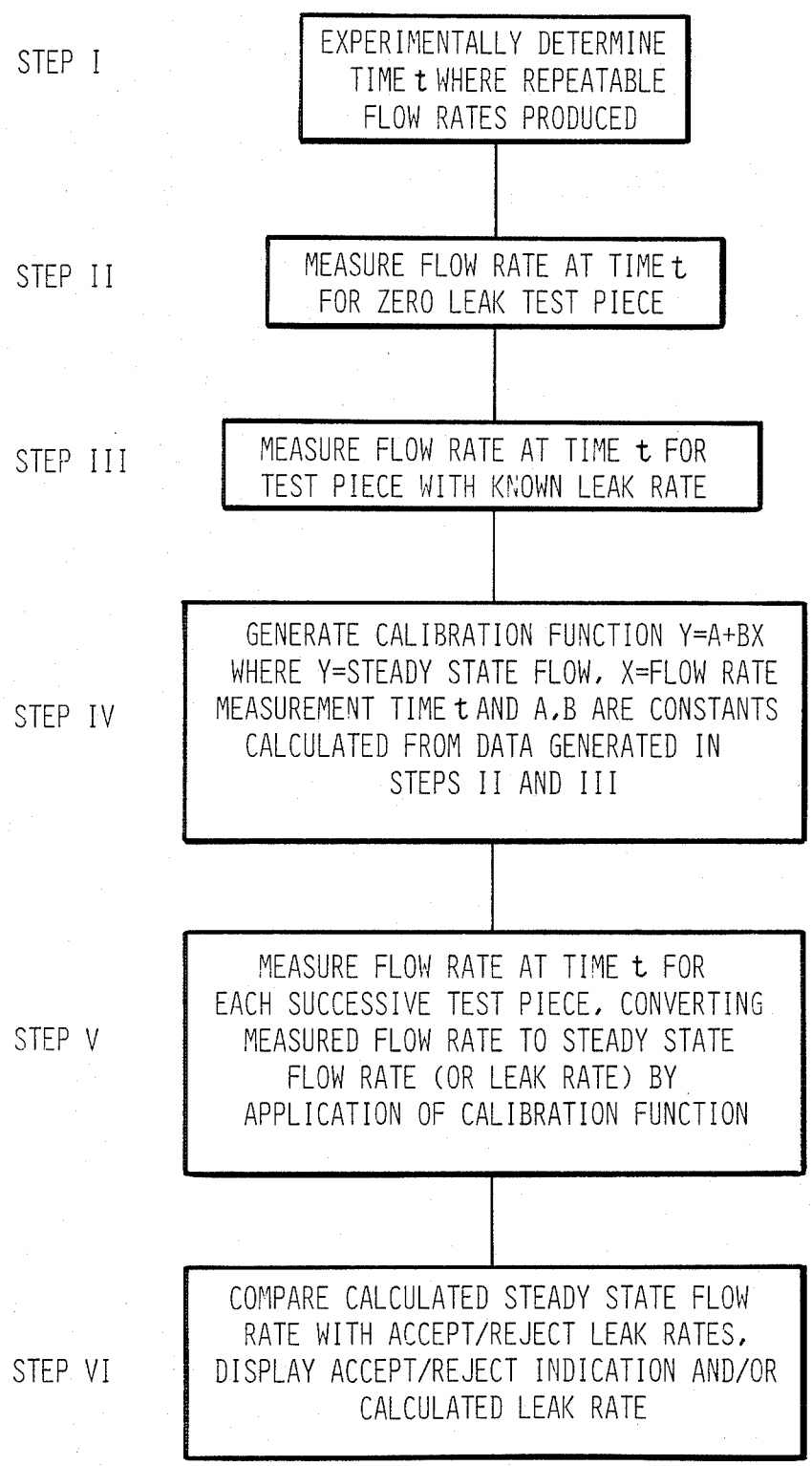
FIG. 4 is a block diagram representation of the basic steps of the method according to the present invention.

Accordingly, the method of the present invention as applied to the flow rate leak testing, as described, is set out in FIG. 4 in block diagrammatic form.

In step 1, an experimental determination is made of the earliest time t in the test cycle where repeatable flow rates are produced by successive test pieces of the same configuration.

In step 2, there is a flow rate measurement at time t of a test piece having a first known flow rate as for example a zero leak test piece as indicated in FIG. 4.

In step 3, the flow rate at time t is measured for a second time period having a known differing leak rate.

In step 4, there is generated a calibration function $y = A + Bx$, where y is the steady state flow, x is equal to the flow rate at the measured time t, and A and B are constants calculated from the data generated in steps 2 and 3.

In step 5, the flow rate is then measured at the time t for each successive test piece, converting the measured flow rate to steady state flow rates or leak rates by the application of the calibration function generated in step 4.

Finally, in step 6, the calculated flow rates are compared with pre-established accept and reject leak rates and an accept or reject indication is provided, with a calculated leak rate preferably also displayed.

Thus, this achieves a test cycle time of minimal interval.

Figure 5:
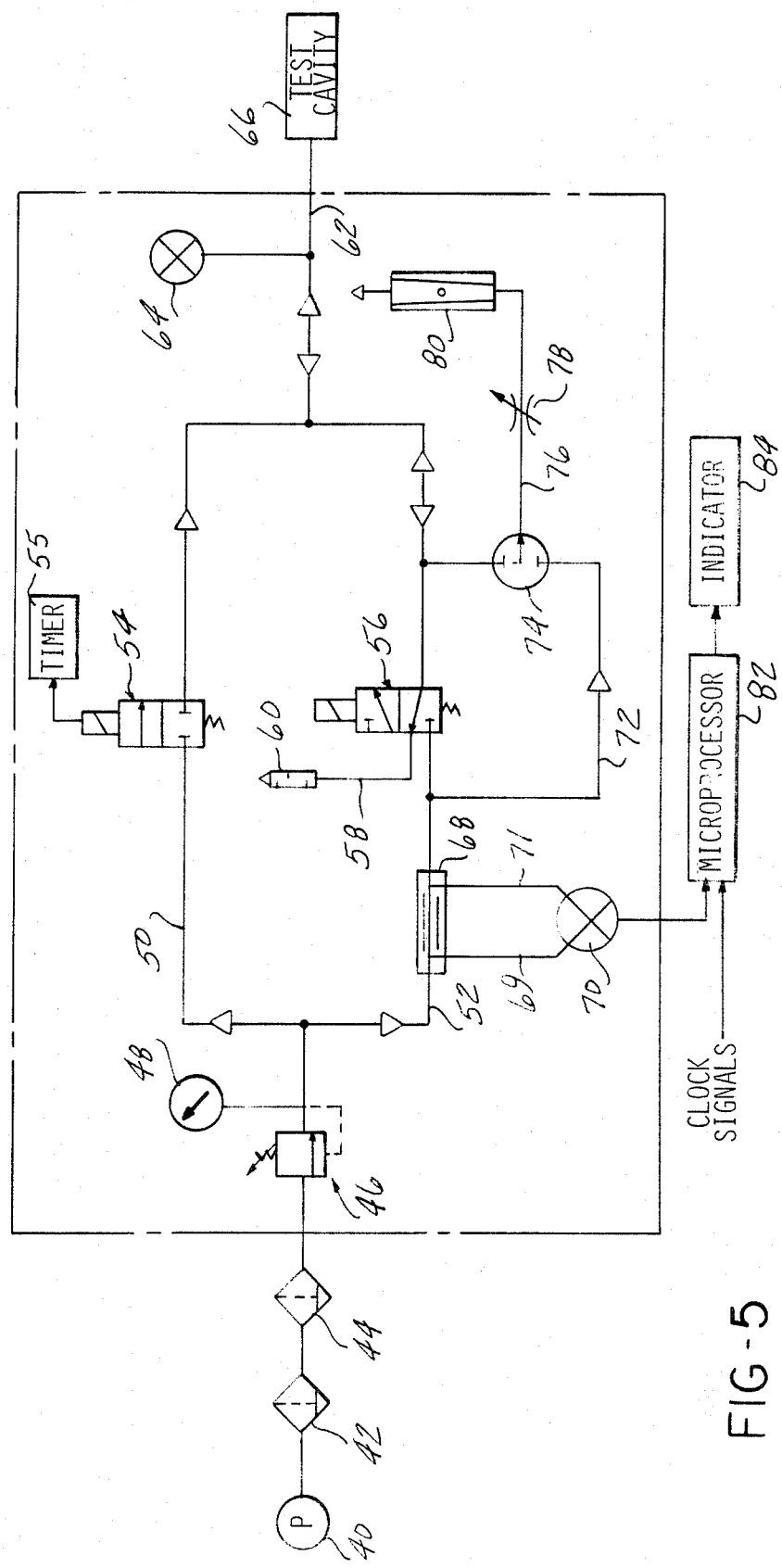
FIG. 5 is a pneumatic circuit diagram of a flow test leak rate measurement apparatus which may be used to perform the method according to the present invention.

FIG. 5 depicts a pneumatic circuit diagram together with a block diagrammatic representation of the associated components, which may be employed in practicing the methods according to the present invention.

A source of air pressure 40 is provided, and a suitable filter such as a 50 micron filter 42 placed in series therewith, as well as an oil coalescing filter 44 eliminating atomized oil or other similar contaminants. A regulator 46 also is provided to closely control the pressure supplied to the remainder of the pneumatic circuitry. A suitable pressure gauge 48 may also be provided.

A pair of parallel passages 50 and 52 are provided as in the above-described pneumatic circuit with a valve 54 controlled by a timer 55 controlling the duration of communication through the passage 50 during each test cycle. A valve 56 controls communication through the passage 52 with respect to a test port 62, in communication with both passages 50 and 52.

Test port 62 allows the pressure to be placed in communication with the cavity of the test piece 66, as indicated diagrammatically.

The valve 56 also is arranged to vent the system through vent passage 58 and exhaust muffler 60, upon movement of the valve 56 so as to close off communication of the passage 52 to relieve the pressure downstream in the pneumatic circuitry and within the cavity of the test piece 66.

A gauge pressure transducer 64 is also provided in the port passage 62 which monitors the pressure developed in the port passage 62 in the event of a gross leak in the test piece 66, the test cycle able to be aborted at that time, in a manner well known to those skilled in the art. That is, if a minimum pressure is not developed in the port passage 62 after a predetermined time interval, this indicates a gross leak and the test may be terminated at this point without the necessity of continuing the test to determine if low volume leaks exist.

The flow passage 52 constitutes the flow rate measuring passage of relatively lower volume capacity.

Connected in series in this passage is a laminar flow element 68 as of the type described in the aforementioned Millar U.S. Pat. No. 3,123,900. A pressure transducer receives pressure signals via passages 69 and 71 and generates electrical signals corresponding to the differential pressure across the laminar flow element 68, and which in turn corresponds to the flow rate in the passage 72, in the manner well known to those skilled in the art.

The microprocessor 82 receives these electrical signals and generates corresponding signals according to the method of the present invention, with a display 84 allowing an indication of an accept/reject signal and/or a digital readout of flow rate values.

A clock signal is also received from the remainder of the electrical components to enable monitoring of the flow rate as a function of the time after initiation of the test cycle, as for example, the time out of the timer 55 to close the valve 54, initiating the beginning of the settle time. It is that event which determines when the time t at which the flow rate measurement is to take place and the steady state flow rate is calculated in accordance with the method of the present invention.

In order to allow convenient and rapid calibration testing, a bypass calibration passage 72 is provided which is connected to a selector valve 74, which allows controlled venting of the pneumatic circuitry at a point in communication with the port passage 62, through a calibrating leak valve 78, which in turn is in fluid communication with the flow meter 80.

Accordingly, in carrying out the calibration testing, a zero leak sample test piece may be placed on the port passage 62, and the flow rate in the time t determined by the microprocessor 82 having a high speed monitoring capability for monitoring the signals received from the pressure transducer 70. Upon operation of the selector valve 74, the test is repeated with a predetermined flow through the passage 76 to the flow meter 80 as previously performed. The test cycle is again repeated and the flow rate at the time t generated, to thus provide the two separate flow rate values at the time t and also the corresponding steady state flow rates.

From this data, the calibration function $y = A + Bx$ may be generated by suitable programming of the microprocessor 82. Accordingly, subsequent testing of the test pieces can be performed at the time t with an accurate calculation of the corresponding steady state flow leak rate for any given measured flow rate at the time t in the cycle.

Accordingly, a minimum cycle time may be employed for flow rate type leak testing while achieving accurate and repeatable results. It can be appreciated that for each test piece configuration, suitable experimental tests must be conducted to determine the minimum time t for a given part at which repeatable reliable flow rate results are achievable. Once such time t is known for a given part configuration, a suitable calibration function may be generated by the simple test procedure described.

It can be appreciated that the calibration is unique for the given test parameters as the test pressures and the time t, etc. It will also be appreciated by those skilled in the art that the suitable microprocessor programming may be carried out to perform the relatively simple calculations described and, accordingly, the details of such apparatus are not here included inasmuch as they are well known to those skilled in the art and do not of themselves form a part of the present invention.

I claim:

1. A method of measuring leak rates from a cavity in test pieces of the same configuration, comprising the steps of:

placing the cavity of each of a series of sample test pieces in communication with a fluid pressure source to initiate a test cycle;

monitoring the flow rate to each of said cavities after placing each of said cavities in communication with said fluid pressure source;

determining the time after initiation of said test cycle when said flow rates become repeatable for successive test pieces;

measuring the flow rate from said fluid pressure source to said cavity at a predetermined time after initiating of said test cycle, after said time determined to produce repeatable flow rates, but prior to the achievement of steady state flow conditions, for two sample test pieces having differing effective leak rates;

determining the corresponding steady state flow rates for said two sample test pieces;

generating a calibration function of the form:

$$y = A + Bx$$

where y is the steady state flow rate to a test piece cavity placed in communication with a fluid pressure source, x is the flow rate measured at an earlier time in the test cycle, and A and B are constants calculated from the testing of the two sample test pieces;

placing the cavities of successive test pieces in communication with said fluid pressure source;

measuring the flow rate to said cavities at said predetermined time in said test cycle;

converting said measured flow rates into corresponding steady state flow rates by application of said calibration function to determine the leak rates from said cavities, whereby said test cycle for determining said leak rates is shortened by measuring said flow rates at said predetermined time.

2. The method according to claim 1 wherein said steps of measuring and determining said flow rates from said sample test pieces comprises the steps of measuring and determining the flow rates to a zero leak master test piece and subsequently introducing a known flow rate bypass to simulate a given leak rate therefrom.

3. The method according to claim 2 further including the step of displaying the value of said converted flow rates.

4. The method according to claim 1 further including the step of comparing said converted flow rates with accept/reject leak rates, and displaying an accept-/reject indication.

5. The method according to claim 1 including the step of monitoring the flow rates from said fluid pressure source by generating electrical transducer signals, and transmitting said signals to a microprocessor.

* * * * *